Figure 1:
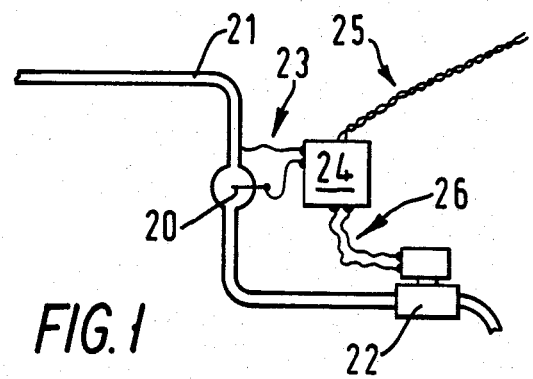

United States Patent [19]

Bridges

[11] Patent Number: 4,505,427
[45] Date of Patent: Mar. 19, 1985

[54] CONDENSATE DRAIN VALVES

[75] Inventor: Robert E. Bridges, Toddington, Nr. Cheltenham, England

[73] Assignee: 501 Loomhurst Limited, London, England

[21] Appl. No.: 539,571

[22] Filed: Oct. 6, 1983

[30] Foreign Application Priority Data

Oct. 12, 1982 [GB] United Kingdom ............... 8229148

[51] Int. Cl.³ .............................................. F24D 3/02
[52] U.S. Cl. ..................................... 236/54; 137/187; 137/204
[58] Field of Search .................................. 236/56–60, 236/54, 53; 137/187, 204

[56] References Cited

U.S. PATENT DOCUMENTS 2,825,508  3/1958  Velan et al. ........................ 236/53
4,261,382  4/1981  Bridges ............................. 137/187

Primary Examiner—William E. Wayner
Attorney, Agent, or Firm—Larson and Taylor

[57] ABSTRACT

Solenoid operated condensate drain valve arrangements for steam systems are described having the following features:
(a) powered by electromotive force obtained by the Seebeck effect;
(b) where electrical sensing probe means control operation of the arrangement, the provision of thermal switch means overriding the action of the probe means and enabling air to escape from the system under start-up conditions;
(c) provision of a monitoring circuit that allows escape of trapped steam which may be having a steam locking effect;
(d) provision of a monitoring circuit that gives a measure of automatic drainage in the event of some failure in the drain valve arrangement.

3 Claims, 6 Drawing Figures

CONDENSATE DRAIN VALVES

This invention relates to condensate drain valves. The invention is particularly concerned with a condensate drain valve for draining condensate from a steam system.

In condensate drain valve arrangements described in published United Kingdon patent application No. 2038032A as for use in steam systems, sensing elements for insertion in the steam systems for triggering electronic circuits for controlling operation of the drain valves of the arrangements are electrical sensing probes operated in dependence upon condensate being present, or not present, at the level of the probe.

A problem is some steam systems is the occurrence of so-called "steam locking" in the condensate drain valves of the systems. Having discharged condensate a drain valve may close to prevent steam escaping at a time when the supply pipe to the drain valve is full of steam. If, due to the pipe layout, this steam cannot be displaced, it will prevent the condensate that is forming upstream of the steam reaching the drain valve, which therefore remains closed, and hence the condensate is not discharged, or rather it is not discharged until, in time, the steam in the steam lock condenses and the drain valve opens again. A drain valve opening under these conditions is not working to its best capabilities in the system, but it is, nevertheless, operating and accordingly it may not always be apparent to an observer that a drain valve is not operating in the most efficient manner possible.

According to the present invention there is provided an electronically operated condensate drain valve arrangement for draining condensate from a steam system, the arrangement comprising a condensate drain valve, an electronic circuit for controlling operation of the valve, and a sensor for insertion in the fluid transfer system to trigger the electronic circuit for closing the valve when the sensor senses that condensate level is below the sensor, the sensor also serving to sense when there is condensate to be discharged at a level about at least part of the sensor and to thereupon trigger the circuit to open the valve, the electronic circuit including a monitoring circuit that monitors the lengths of the intervals between successive valve opening operations and that triggers the electronic circuit so that the valve opens for a predetermined time and then closes again upon the interval between successive valve opening operations exceeding a predetermined maximum. The monitoring circuit can be arranged to open the valve for, say, one second if the valve has not opened for, say, two minutes. These periods are examples only and either or both could be longer. Such opening of the valve will allow trapped steam which may be having a steam locking effect to escape, thereby removing the steam lock. In addition, if through some failure in the drain valve arrangement, the drain valve is not opening even when condensate to be discharged is collecting at the drain valve, a measure of automatic drainage of this condensate will be obtained for as long as the monitoring circuit continues to bring about valve opening.

Figure 1A:
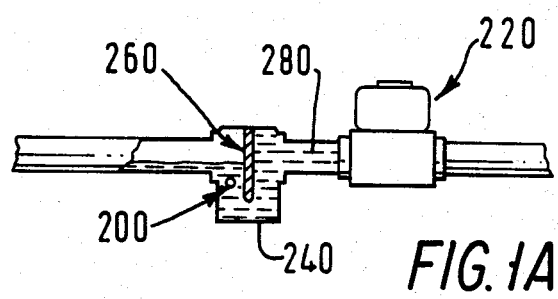
Figure 2A:
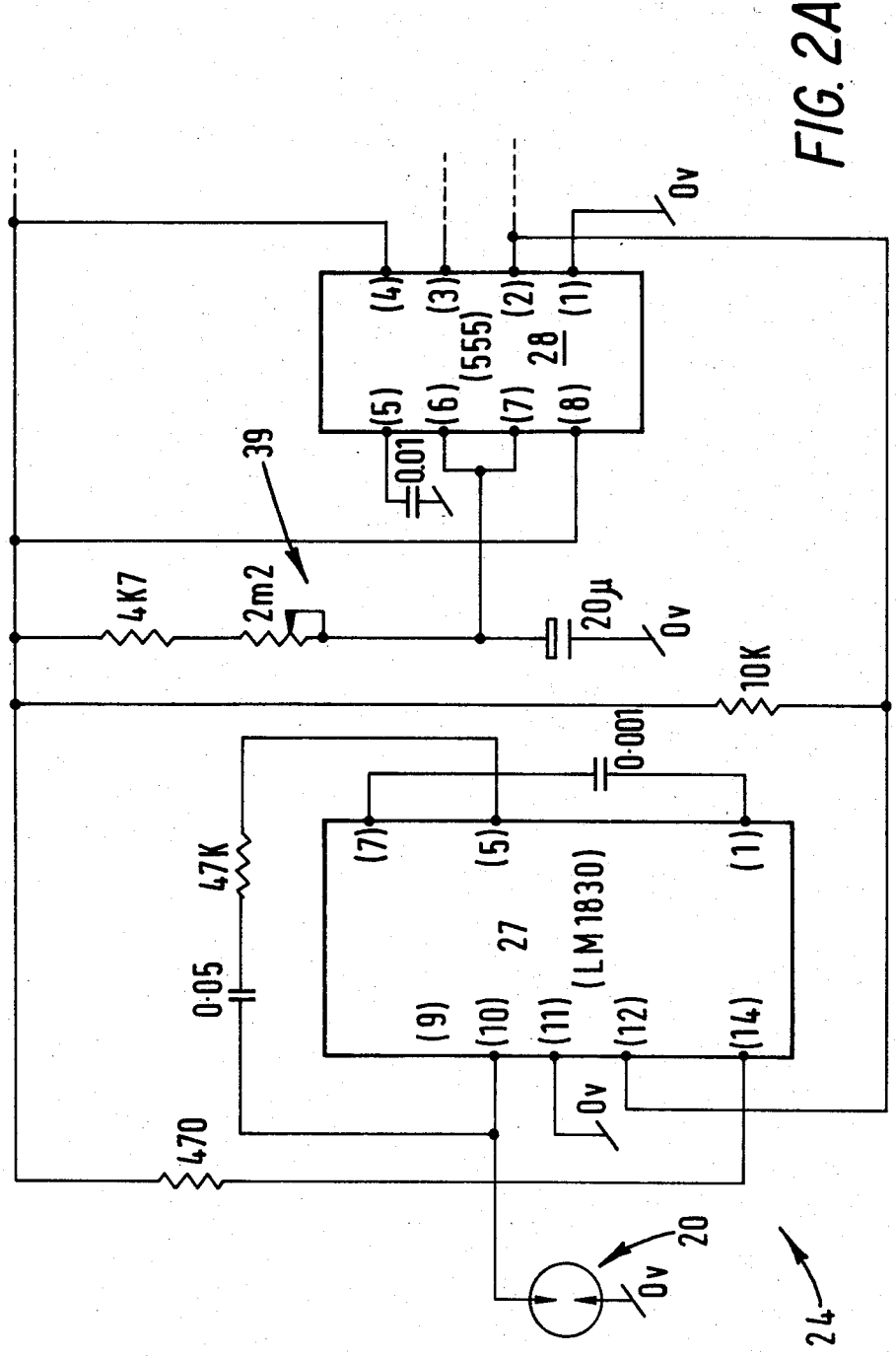
Figure 2B:
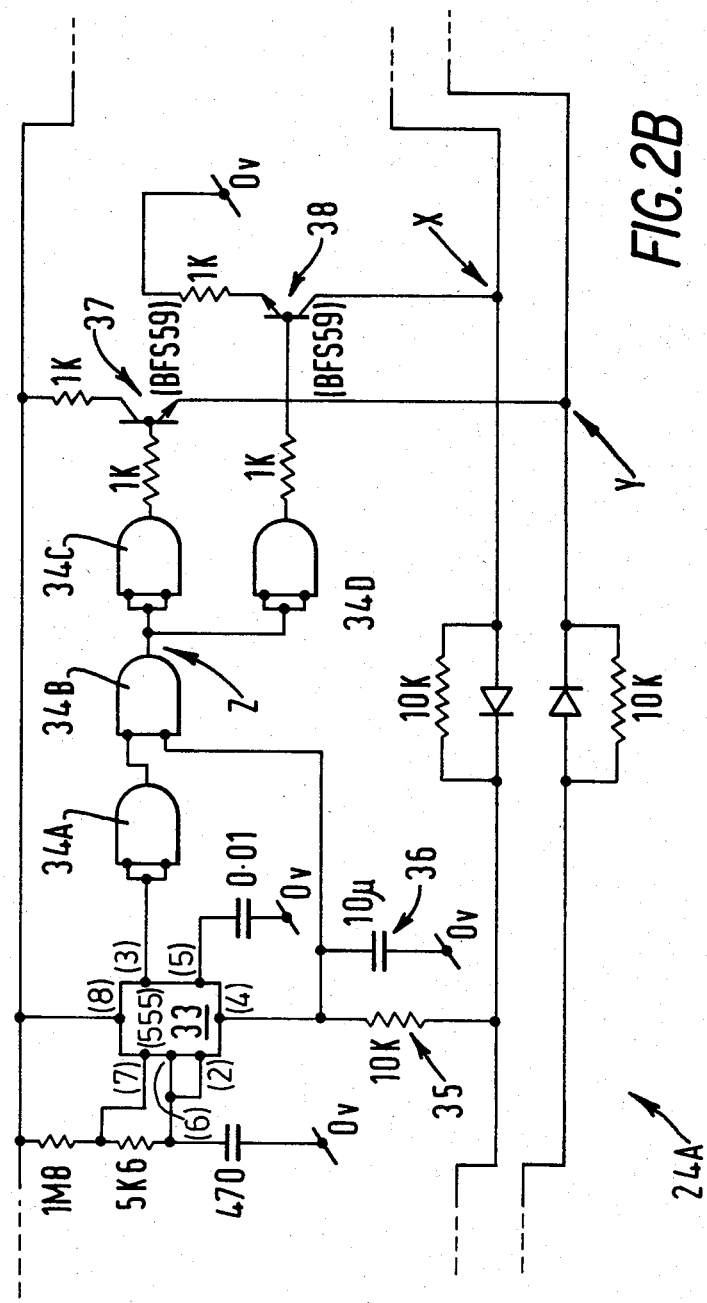
Figure 2C:
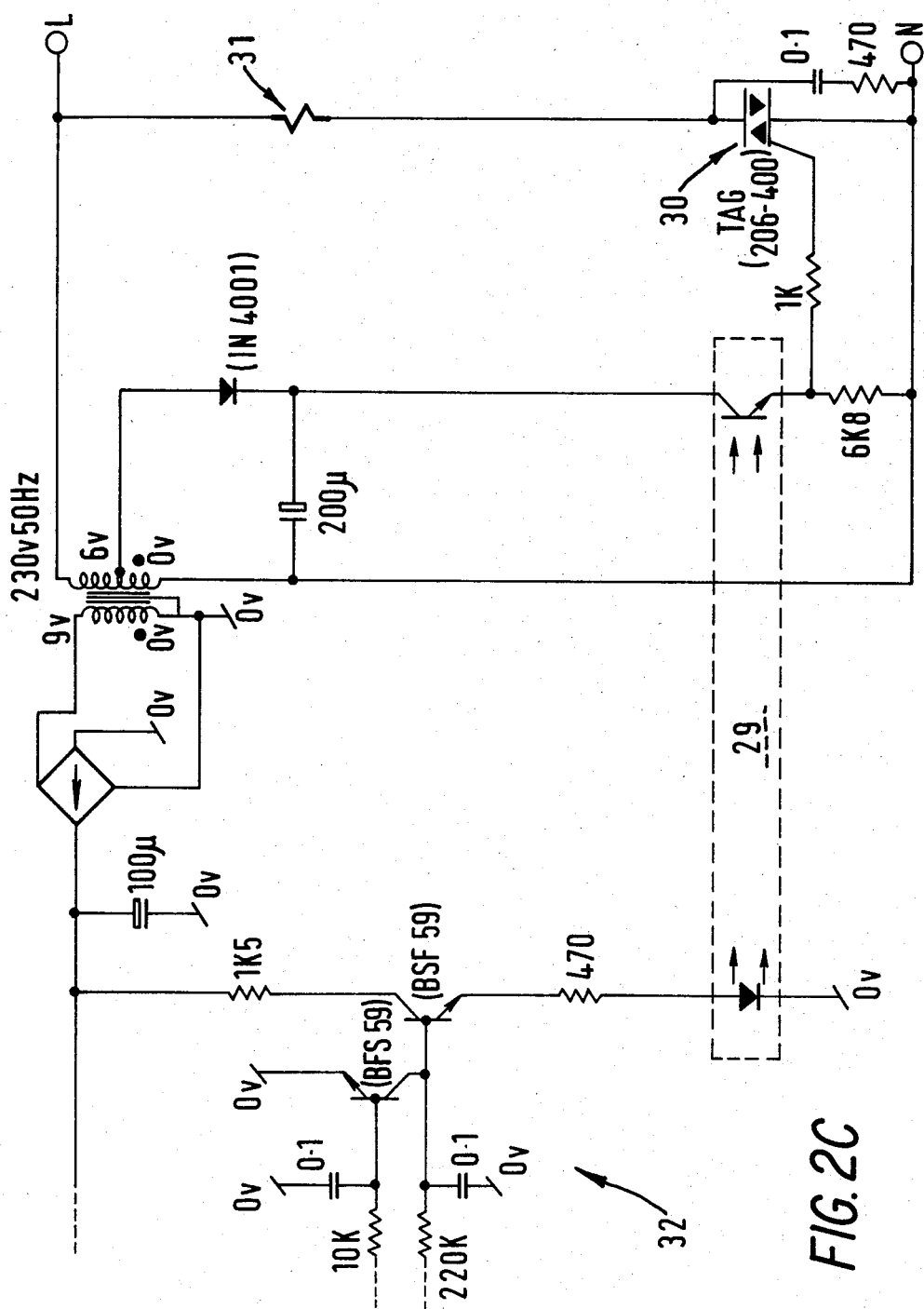
Figure 3:
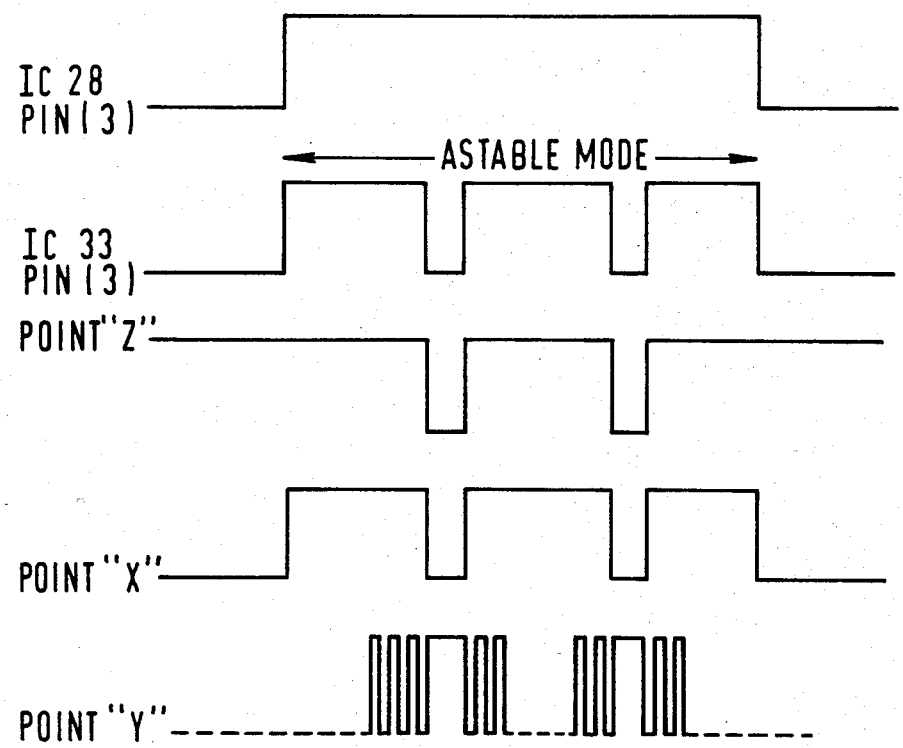

For a better understanding of this aspect of the invention, reference will now be made, by way of example, to 2A, 2B and 2C the accompanying drawings, in which:

FIG. 1 is a schematic illustration of a condensate drain valve arrangement in a steam system, FIG. 1A is a schematic illustration of an alternative form of the drain valve arrangement of FIG. 1, FIGS. 2A, 2B and 2C together constitute a circuit diagram of an electronic circuit of the drain valve arrangement of FIG. 1, and FIG. 3 is a timing diagram.

The condensate drain valve arrangement of FIG. 1 consists of an electrical sensing probe 20 inserted in a condensate drain line 21 of the steam system upstream of a solenoid operated condensate drain valve 22 and so as to be electrically insulated from the wall of the drain line. Electrical leads 23 connect the probe 20 and the wall of the drain line 21 to an electronic circuit 24 which has voltage supply leads 25 and which is connected to the solenoid of the valve 22 by leads 26.

As shown in FIGS. 2A, 2B and 2C, the electronic circuit 24 includes a first integrated circuit 27 which serves to compare the signal from the probe 20 with an internal resistance of the circuit 24; a second integrated circuit 28 that is a solid state timer; an opto-isolator 29; and a triac 30. The coil of the solenoid of the valve 22 is represented at 31. Operation is as follows. An AC signal is passed to the sensing probe 20. If there is no condensate at the level of the probe 20 the output at pin (12) of the first integrated circuit 27 oscillates at a frequency of 6 KHz. If the probe is covered by condensate there is a steady positive output at pin (12). The output from pin (12) is taken to pin (2) of the timer integrated circuit 28. Taking timer circuit pin (2) to zero volts (i.e. by feeding the 6 KHz oscillating signal to it) initiates a timing cycle during which timer circuit pin (3) is held at $+V$ and in this condition the solenoid coil 31 is de-energised. At the conclusion of a timing cycle, and until initiation of the next timing cycle, timer circuit pin (3) is at zero volts and the transistors and solid state switches generally referenced 32 in the electronic circuit 24 switch the coil 31 to its energised condition.

At start up, if there is no condensate at the probe 20, the oscillating output of the first integrated circuit 27 initiates a timing cycle (as the first excursion down to zero volts triggers the timer circuit 28). The solenoid valve is held shut. If, at the end of the first timing cycle, there is still no condensate at the probe, another cycle is initiated. When condensate has built up to submerge the probe during a timing cycle, the output of the first integrated circuit 27 changes to a steady positive voltage and, at the end of this cycle, the output at the timer circuit pin (3) changes to zero volts. The solenoid valve opens and the condensate is discharged. When the probe is no longer submerged the output from the first inegrated circuit 27 changes back to the 6 KHz oscillation which initiates a timing cycle, simultaneously taking timer circuit pin (3) positive and de-energising the coil 31 of the solenoid valve, which closes.

Thus in the condensate drain valve arrangement of FIG. 1 incorporating the circuit 24 of FIGS. 2A, 2B and 2C, a sensor (the probe 20) sensing condensate level below the probe 20 serves to trigger the circuit 24 to operate the valve 22, with at least a desired minimum period between successive valve opening operations of the valve being imparted by a delay means (the timer integrated circuit 28) in the electronic circuit 24.

As discussed above, upon closing after discharging condensate, the drain valve 22 may trap steam in such a manner as to lead to a steam lock. The circuit 24 includes a monitoring circuit 24A (FIG. 2B) which is connected between the timer integrated circuit 28 and the transistors and solid state switches 32. This monitoring circuit 24A monitors the lengths between successive valve opening operations, and triggers the circuit 24 to open the valve 22 for a predetermined time if the interval between successive valve opening operations exceeds a predetermined time.

The monitoring circuit 24A includes a further timer integrated circuit 33 and an arrangement of NAND gates 34A, 34B, 34C, 34D. The output from pin (3) of the timer integrated circuit 33 is inverted by gate 34A and NANDed by gate 34B with the output from pin (3) of the timer integrated circuit 28, this output having first been fed through a filter composed of resistor 35 and capacitor 36. The filtered output from pin (3) of the timer integrated circuit 28 is also fed to the reset pin (4) of the timer integrated circuit 33.

When pin (3) of the timer integrated circuit 28 is taken to zero volts (valve open condition), the timer integrated circuit 33 is reset and the output from gate 34B is +V. This output is inverted by gates 34C and 34D and transistors 37 and 38 are OFF.

When pin (3) of the timer integrated circuit 28 goes to +V (valve closed condition) the timer integrated circuit 33 is enabled in its astable mode, thereby simulating a valve opening condition for a period of approximately two seconds every ten minutes, by switching the transistors 37 and 38 to ON should the valve 22 not otherwise open as a result of pin (3) of the timer integated circuit 28 going to zero volts. The timing diagram of FIG. 3 shows the wave forms at the pins (3) of the timer integrated circuits 28 and 33, and at points Z, X and Y in the monitoring circuit 24A.

The times of two seconds and ten minutes are examples only, but it will be appreciated that the intervals between successive valve openings as determined by the monitoring circuit 24A will be selected to be longer than the minimum intervals as determined by the remainder of the circuit 24 as a whole so that the effect of the monitoring circuit 24A is to give a valve opening effect in the event that the interval between successive valve opening operations brought about by the remainder of the circuit 24 exceeds a predetermined maximum. By bring about valve opening at least at these predetermined maximum intervals, the monitoring circuit 24A can bring about release of steam that is causing a steam lock, or can give some measure of condensate discharge if some mal-function is preventing this happening in normal manner.

The operating time of the timer integrated circuit 28 can be preset, or provision can be made for adjusting this time over a wide range, see resistor 39 in FIG. 6A. The operating time of the timer integrated circuit 33 could be made adjustable.

In FIG. 1 the sensor 20 is shown disposed in a vertical pipe run, above the drain valve 22. The sensor is so sited to minimise the risk of steam loss from the drain valve but in long horizontal pipe runs such siting cannot be implemented. In FIG. 1A there is shown a sensor 200 disposed upstream of a drain valve 220 in a horizontal pipe run. The sensor is mounted in a chamber 240 upstream (with respect to the drain valve 220) of a baffle 260 that depends from the upper wall of the chamber. This baffle 260 causes the condensate 280 to form a water seal between the sensor 200 and the discharge orifice of the drain valve 220.

I claim:

1. An electronically operated condensate drain valve arrangement for draining condensate from a steam system, the arrangement comprising a condensate drain valve, an electronic circuit for controlling operation of the valve, and a sensor for insertion in the fluid transfer system to trigger the electronic circuit for closing the valve when the sensor senses that condensate level is below the sensor, the sensor also serving to sense when there is condensate to be discharged at a level about at least part of the sensor and to thereupon trigger the circuit to open the valve, the electronic circuit including a monitoring circuit that monitors the lengths of the intervals between successive valve opening operations and that triggers the electronic circuit so that the valve opens for a predetermined time and then closes again upon the interval between successive valve opening operations exceeding a predetermined maximum.

2. A valve arrangement as claimed in claim 1, wherein the electronic circuit includes a first integrated circuit which serves to compare the signal from the sensor with an internal resistance of the circuit; a second integrated circuit that is a solid state timer; an opto-isolator; and a triac; and wherein the valve is a solenoid-operated valve; the sensor receiving an AC signal in operation of the arrangement and the electronic circuit operating such that if there is no condensate at the level of the sensor there is an oscillating output from the first integated circuit whereas if the sensor is covered by condensate there is a steady positive output from the first integrated circuit; the second integrated circuit being connected to receive the output from the first integrated circuit so as to initiate a timing cycle upon receiving said oscillating output, an output from this second integrated circuit being positive during this and any subsequent timing cycle and in this condition the valve solenoid being de-energised, and this output changing to zero at the conclusion of the timing cycle to switch the solenoid to its energised condition, the monitoring circuit being connected between the second integrated circuit and means for switching the solenoid to its energised condition, and serving for monitoring the lengths between successive valve opening operations, and for triggering the electronic circuit to open the valve for a predetermined time if the interval between successive valve opening operations exceeds a predetermined time.

3. A valve arrangement as claimed in claim 2, wherein the monitoring circuit includes a further integrated circuit that is a solid state timer, and an arrangement of NAND gates, the output from this further integrated circuit being inverted by a first of the NAND gates and NANDed by a second of the NAND gates with the output from the second integrated circuit, this output having first been fed through a resistor/capacitor filter and the filtered output of the second integrated circuit being also fed to a reset pin of the further integrated circuit, whereby when the output of the second integrated circuit is taken to zero (valve open condition) the further integrated circuit is reset and has an output that is positive and which is inverted by third and fourth of the NAND gates so that associated transistors are OFF, whereas when the output of the second integrated circuit goes to positive (valve closed condition) the further integrated circuit is enabled in an astable mode, thereby simulating a valve opening condition for a predetermined period at predetermined intervals by switching said associated transistors to ON should the valve not otherwise open as a result of the output of the second integrated circuit going to zero, the intervals between successive valve openings as determined by the monitoring circuit being longer than minimum intervals as determined by the remainder of the electronic circuit as a whole so that the effect of the monitoring circuit is to give a valve opening effect in the event that the interval between successive valve opening operations brought about by the remainder of the electronic circuit exceeds a predetermined maximum.

* * * * *